United States Patent [19]

Friswell

[11] Patent Number: 4,600,473

[45] Date of Patent: Jul. 15, 1986

[54] CONTROL OF LABORATORY EVAPORATION

[75] Inventor: David R. Friswell, Holliston, Mass.

[73] Assignee: Zymark Corporation, Hopkinton, Mass.

[21] Appl. No.: 669,960

[22] Filed: Nov. 9, 1984

[51] Int. Cl.$^4$ ............................................. B01D 1/14
[52] U.S. Cl. ..................................... 159/47.1; 34/30; 34/34; 159/16.1; 422/101; 422/255
[58] Field of Search ............... 34/22, 26, 30, 43, 46, 34/48, 32, 34; 422/243, 255, 101; 159/16 R, 47.1, DIG. 2, DIG. 3

[56] References Cited

U.S. PATENT DOCUMENTS 2,933,823  4/1960  Cramer et al. ........................ 34/48

Primary Examiner—Frank Sever
Attorney, Agent, or Firm—Andrew F. Kehoe

[57] ABSTRACT

Improved means for evaporating liquid to obtain solid residue. The invention is particularly useful where small quantities of a solid is to be recovered from a first liquid medium and dissolved in another liquid medium. The invention comprises a receptable for holding the liquid to be treated and means to sense the temperature of the evaporating process and terminate the evaporating process at any appropriate predetermined temperature condition, thereby avoiding excessive drying of a particular material.

10 Claims, 5 Drawing Figures

U.S. Patent     Jul. 15, 1986     4,600,473
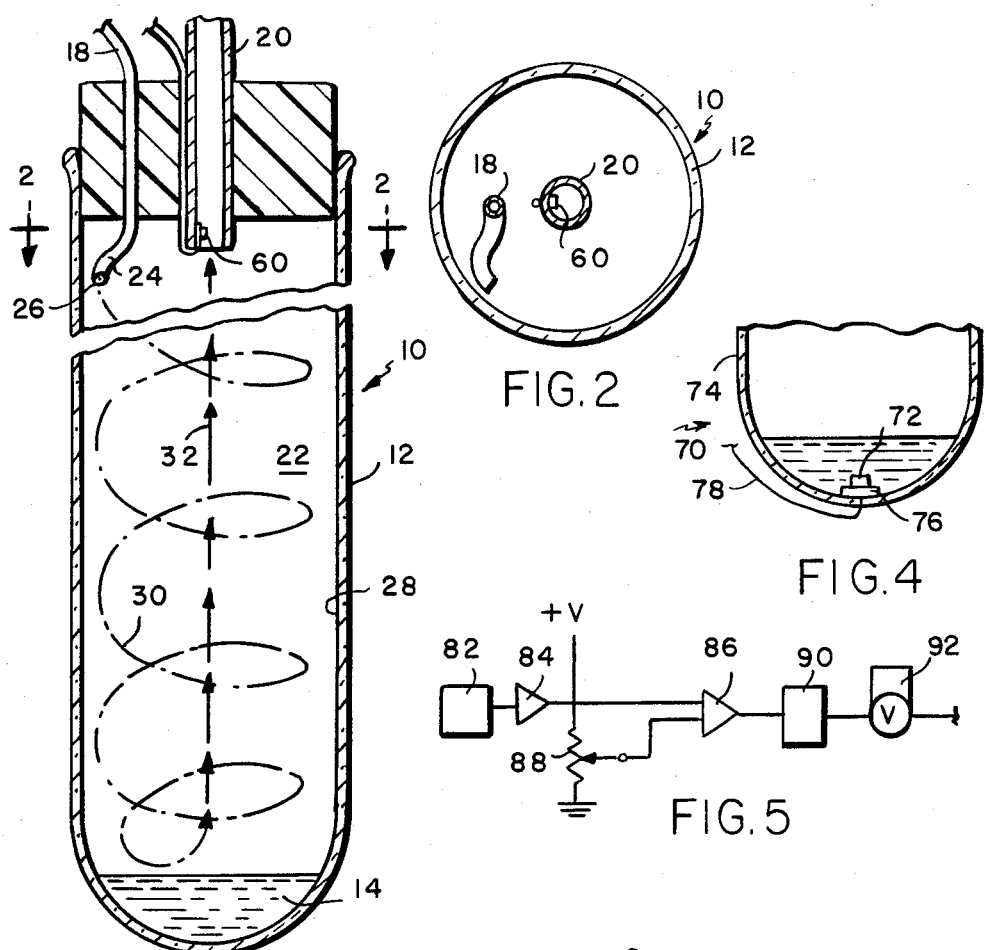
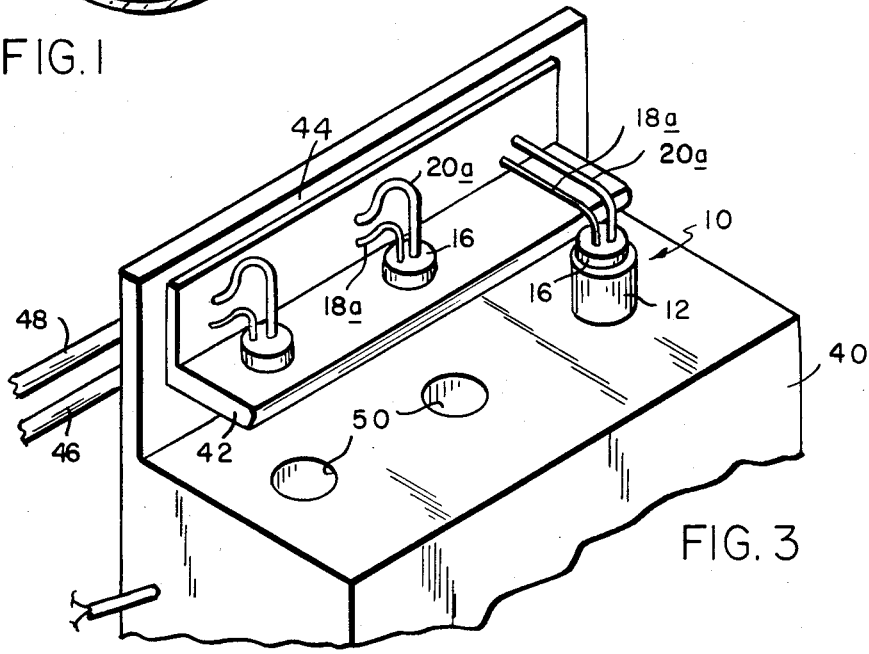

CONTROL OF LABORATORY EVAPORATION

BACKGROUND OF THE INVENTION

This invention relates to (a) novel processes for controlling the evaporating of liquid from a chemical sample, with drying gas, or like processes, and (b) apparatus useful in such processes.

It is often desirable to transfer a solute from one solvent system to another solvent system. For example, this procedure is used frequently in liquid chromatography where a first solution, perhaps a liquid fraction obtained from one chromatographic procedure, can be more specifically analyzed by use of a different solvent to carry the dissolved components of the first solution. In the past, it has been common to place the first solution into a tube and, using a gas sparge tube, or cannula, contact the solution with sufficient drying gas to remove the unwanted liquid.

A number of problems are associated with this procedure. Sometimes a sensitive solid product is damaged by continuing to pass drying gas into the apparatus beyond the optimum drying point. Moreover, it is sometimes desirable to leave the solid contents in a somewhat pasty or damp condition. At present, to avoid damage of such samples, it is convenient to dry stepwise or to slow down drying rate to a fraction of the possible drying rate, thereby reducing the chance that an operator will be inattentive for a period long enough to allow the samples to be dried excessively.

SUMMARY OF THE INVENTION

It is a principle object of the invention to provide a novel process whereby laboratory evaporation procedures are made more efficient by an improvement in the means by which the appropriate dryness of a sample is sensed.

It is a further object of the invention to provide a novel process whereby dried samples of predictable rewettability or dryness may be provided rapidly.

Another object of the invention is to provide a superior process, and improved apparatus, for monitoring the quality of solids being prepared by evaporative process.

Other objects will be obvious to those skilled in the art on their reading of this application.

The above objects have been substantially achieved by construction of a thermally-sensitive sample-processing system comprising a receptacle for liquid being processed and means to monitor the temperature of the system based upon the rate of liquid evaporation from the sample being processed.

In one embodiment of the invention, and gas feed means is used to supply carrier gas into the receptable such that the gas follows a path downwardly along the receptable wall until it reaches the material to be treated. This procedure serves to leave a relatively free central path in the receptacle through which the process gas, now laden with any material being evaporated, may proceed upwardly through the central portion of the volume enclosed by the walls of the receptacle. Because the gas leaving the receptable is not much diluted by mixing with the incoming gas, it is more sensitive to thermal changes normally indicative of an "end point" of an evaporation step. It is important to understand that this "end point" can be characterized by an absolute temperature a temperature differential or a rate in change of temperature. In turn, these either by a temperature rise indicative of a decreased rate of evaporation, by a constant temperature indicative of the dry point, or—in the case where the material being dried as being heated—a rise in temperature related to the fact that heat is no longer being absorbed as rapidly by the evaporating of liquid from material.

Thus one, is the use of a collection tube for removing the outgoing gases and mounting, on it or in it, and a thermistor for sensing the temperature of the off-gas. Such a device, on sensing a rise in temperature of the offgas, would report the completion, or near completion, of the drying to a control means which would respond with an appropriate action. For example, it could shut off the drying gas, alarm an operator, or the like.

However, it is also useful to sense the temperature or rate of temperature change at the site of evaporation near the bottom of the drying tube. This can be accomplished by the use of sensors inside the tube, buried in the tube wall, or outside the tube. Moreover, the temperature could be sensed by the temperature-sensitive robot hands constructed according to the principles described in the article "A Simple Thermal Touch Sensor" appearing in Vol. 6, No. 10 of Robotics Age magazine R. A. Russell, which article is herein incorporated by reference.

In one specific mode of the invention, the receptacle will be tubular and will be equipped with a tube for supplying incoming gas. This outlet of the gas-supply tube will be so arranged that it will provide a generally helical flow path along the interior wall of the tube until it reaches the material being treated. Thereupon, the outgoing gas will rise and exit a central outlet port which may be conveniently tied to an exhaust manifold.

In one mode of practicing the invention, it is contemplated that a number of such evaporating units will share a single laboratory station. Each unit can, typically, consist of a drying tube, a closure means for the drying tube which would also form means to hold and position the inlet and outlet gas conduits. Each drying tube would be held in a thermostated stand and the closure members with the inlet and outlet conduit could be conveniently positioned on the stand also.

It also should be noted that the apparatus, as illustrated below, is particularly useful in conjunction with robot means. A robot arm can be used to pick up a conduit-bearing closure from a storage shelf and place it into the test tube. Moreover, as indicated above, the temperature-sensing element may be associated directly with a robot hand which carries said tube.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 1 is a perspective view, somewhat schematic, of an apparatus constructed according to the invention.

FIG. 2 is a view downwardly of one apparatus according to the invention showing the position of a gas inlet conduit.

FIG. 3 is a perspective view, somewhat schematic, of a station comprising a number of apparatus described in FIG. 1.

FIG. 4 shows relative position between a gas inlet conduit and a temperature-sensing means.

FIG. 5 is a control circuit useful with the apparatus and process of the invention.

Referring to FIGS. 1 and 2, it is seen that the liquid-evaporating apparatus 10 comprise a test tube 12 forms a vessel for receiving a quantity of liquid 14 which comprises a solute dissolved therein. Tube 12 is equipped with a closure 16 through which gas inlet conduits 18 and gas inlet 20 pass into the headspace 22 within tube 12 and above liquid 14.

Conduit 18, about 0.030 inches in inside diameter is arranged such that its terminal portion 24, and its discharge port 26 causes the gas to be discharged somewhat downwardly (preferably at an angle of from 10 to 50 angular degrees, but most advantageously at about 15 to 30 degrees) along the interior wall 28 of the tube 12. As indicated schematically at 30, the gas flow from conduit 18 hugs the wall in a helical pattern until it reaches liquid 14 (or wet solid which gradually appears as its solvent is evaporated from the mass of liquid 14).

The motion of the inflowing gas induces a natural internal path for removal of moisture-carrying gas up the central portion of the test tube, as indicated at 32 of FIG. 1. The gas is carried past a thermistor 60 which forms means for sensing the temperature of the gas and reporting such temperature to circuitry which, in response to said temperature, stops or controls the flow of drying gas.

FIG. 3 illustrates one convenient way to utilize the invention. Several of the apparatus 10 are utilized in conjunction with a central processing station 40. The closures 16 are kept on a shelf 42 with the necessary flexible conduits 18a and 20a extending, retracted, behind the facade 44 to manifolds 46 and 48 respectively. The test tube holding receptors 50 in station 40 are desirably thermostated electrically in a "dry" heat bath, e.g. an aluminum block.

FIG. 4 illustrates an apparatus 70 how a temperature sensor 72 can be positioned in a test tube 74 to the sample being treated. The sensor 72 sits on an insulating gasket 76 and is operably connected to a control sensing circuit by electrical conduit 78. This is often preferred when more sensitive temperature measurements, e.g. detection of a more slowing of the rate of evaporation is desirable.

FIG. 5 illustrates a schematic diagram of a simple control circuit 80 useful with the invention. Circuit 80 comprising a thermal sensor 82 having a voltage output proportional to the temperature of the material being dried. The signal is buffered as through an amplifier/filter system 84 and then the resulting signal is compared in a comparitor 86 against a set point, e.g. as with variable resistor 88. The resulting signal is usually further processed according to the needs of a particular system through a amplification system and the output signal is used to control a drying-gas cooling supply as by operation of a solenoid valve as indicated at 92, or to actuate an alarm to alert an operator, or to vary the rate of drying gas, etc.

Such sensitive measurements make it easy to detect and stop a drying action by cutting off the supply of drying gas when a solid residue is still wet and susceptible to easy redispersal and solvation. Also, it provides a means to assure sensitive biological products are not damaged by excessive drying.

It is also to be understood that the following claims are intended to cover all of the generic and specific features of the invention herein described and all statements of the scope of the invention which might be said to fall therebetween.

What is claimed is:

1. In a process for recovering solids from liquids by evaporating said liquid until said solids have been converted to a solid composition of a desired state of dryness, said process comprising the steps of:
   (a) placing a liquid composition containing said solids and said liquid in a tubular receptacle;
   (b) causing drying gas to flow into said receptacle through an inlet to said tubular receptacle which inlet directs the flow of said drying gas preferentially along the wall of said receptacle and into intimate contact with said solution as the liquid is being removed from said solution;
   (c) then removing said drying gas through another conduit in said inlet of said tubular receptacle while avoiding dilution of said gas by said incoming gas so as to maintain a significant temperature difference between incoming drying gas and outgoing gas during said evaporating process;
   (d) sensing a change in rate of evaporation by thermally monitoring the temperature of said evaporation process; and
   (e) decreasing the flow of drying gas in response to said sensed change in rate of evaporation, thereby obtaining said solid in said desired state.

2. A process as defined in claim 1 and wherein said incoming gas is directed in a helical path from a position proximate the top of said container along the interior wall of the container to contact said liquid being evaporated, and wherein said outgoing gas is preferentially removed upwardly through the central region of said container.

3. A process as defined in claim 2 wherein said temperature of said drying gas is sensed as it is being removed from said receptacle and is used as a criterion for determining said desired rate.

4. A process as defined in claim 2 wherein said helical path is initiated at an angle of from about 10 to 50 angular degrees downwardly from horizontal.

5. A process as defined in claim 1 wherein the temperature of the material being dried is sensed, at a position proximate to said material, and used as a criterion of said desired state.

6. Apparatus for isolating solids from liquids by evaporating said liquid, said apparatus comprising:
   (a) a tubular vessel having a closure only at the top thereof and forming means to hold a liquid composition position to be dried to a suitably dry state near the bottom thereof;
   (b) a first supply conduit through said closure and positioned near the top of said vessel forming means for conveying drying gas into said tube through said opening, and into contact with said composition being dried;

(c) a second conduit located in said closure and forming means to remove said drying gas after it has contacted said composition being dried;

(d) each said conduit means accessing said tube at said tubular opening and said conduits together forming a means to avoid excessive dilution of incoming gas by gas being removed from said vessel;

(e) a control circuit forming means to sense a temperature condition of said evaporating; and (f) circuit means to reduce or stop the flow of said drying gas in response to said temperature condition.

7. Apparatus as defined in claim 6 wherein said first supply conduit forms means to direct said incoming gas in a helical path along the interior wall of said tube and wherein said second conduit is centrally located within said single opening.

8. Apparatus as defined in claim 7 wherein said tubular vessel is a test tube.

9. Apparatus as defined in claim 8 wherein said tubular vessel is a test tube.

10. Apparatus as defined in claim 8 wherein said first supply conduit forms means to direct said incoming gas in a helical path at an angle of from about 15 to 30 angular degrees downwardly along said wall.

* * * * *

UNITED STATES PATENT AND TRADEMARK OFFICE
CERTIFICATE OF CORRECTION

PATENT NO. : 4,600,473

DATED : July 15, 1986

INVENTOR(S) : David R. Friswell

It is certified that error appears in the above-identified patent and that said Letters Patent is hereby corrected as shown below:

Column 1, line 54, "receptable" should read -- receptacle --.
Column 1, line 56, "receptable" should read -- receptacle --.
Column 1, line 62, "receptable" should read -- receptacle --.

Signed and Sealed this

Twenty-fifth Day of November, 1986

Attest:

DONALD J. QUIGG

*Attesting Officer*  *Commissioner of Patents and Trademarks*